(12) United States Patent
Jiang et al.

(10) Patent No.: US 6,647,484 B1
(45) Date of Patent: Nov. 11, 2003

(54) TRANSPOSE ADDRESS MODE IN GENERAL PURPOSE DSP PROCESSOR

(75) Inventors: Chongjun June Jiang, Aliso Viejo, CA (US); Kan Lu, Irvine, CA (US); Chung Tao-Chang, Santa Ana, CA (US)

(73) Assignee: 3 DSP Corporation, Irvine, CA (US)

( * ) Notice: Subject to any disclaimer, the term of this patent is extended or adjusted under 35 U.S.C. 154(b) by 533 days.

(21) Appl. No.: 09/664,839

(22) Filed: Sep. 19, 2000

(51) Int. Cl.[7] ............................................. G06F 12/00
(52) U.S. Cl. ..................... 711/220; 711/110; 711/201; 711/216; 711/217; 711/219
(58) Field of Search ................. 711/220, 110, 711/201, 216, 219, 217, 213; 714/808; 708/520, 532

(56) References Cited

U.S. PATENT DOCUMENTS

| | | | | | |
|---|---|---|---|---|---|
| 4,202,035 A | * | 5/1980 | Lane | ............................ | 711/217 |
| 4,370,732 A | * | 1/1983 | Kogge | ............................ | 711/5 |
| 4,800,524 A | * | 1/1989 | Roesgen | ............................ | 711/217 |
| 4,908,748 A | | 3/1990 | Pathak et al. | ............................ | 711/220 |
| 4,935,867 A | | 6/1990 | Wang et al. | ............................ | 711/217 |
| 5,394,553 A | * | 2/1995 | Lee | ............................ | 712/14 |
| 5,398,322 A | * | 3/1995 | Marwood | ............................ | 711/217 |
| 5,623,621 A | * | 4/1997 | Garde | ............................ | 711/220 |
| 5,636,224 A | * | 6/1997 | Voith et al. | ............................ | 714/701 |
| 5,649,146 A | * | 7/1997 | Riou | ............................ | 711/217 |
| 5,659,700 A | * | 8/1997 | Chen et al. | ............................ | 711/217 |
| 5,918,252 A | * | 6/1999 | Chen et al. | ............................ | 711/217 |
| 5,924,114 A | * | 7/1999 | Maruyama et al. | ............................ | 711/110 |
| 5,983,333 A | * | 11/1999 | Kolagotla et al. | ............................ | 711/219 |
| 6,047,364 A | * | 4/2000 | Kolagotla et al. | ............................ | 711/217 |
| 6,073,228 A | | 6/2000 | Holmqvist et al. | ............................ | 711/217 |
| 6,138,190 A | * | 10/2000 | Nordling | ............................ | 710/60 |
| 6,363,470 B1 | * | 3/2002 | Laurenti et al. | ............................ | 711/220 |
| 6,560,691 B2 | * | 5/2003 | Chen | ............................ | 711/219 |

* cited by examiner

Primary Examiner—Hong Kim
(74) Attorney, Agent, or Firm—Robert Moll

(57) ABSTRACT

The present invention provides a register-indirect addressing mode using modulo arithmetic to transpose addresses for digital processing systems. The preferred systems and methods permit direct access of column data, which improves matrix computation significantly. The overhead of transpose mode is minimal because it can be implemented, if desired, by sharing hardware and/or software used in circular buffers. Transpose addressing mode also reduces program size and processor power consumed by reducing the sequence of instruction cycles.

2 Claims, 5 Drawing Sheets

| Address | Base/End Registers | Index Register | Index Register Sequence |
|---|---|---|---|
| 6 | | | |
| 7 | | | |
| 8 | Base | 0 | First Index/Fourth Index |
| 9 | | 1 | |
| 10 | | 2 | |
| 11 | | 3 | |
| 12 | | 4 | |
| 13 | | 5 | |
| 14 | | 6 | |
| 15 | | 7 | |
| 16 | | 8 | Second Index |
| 17 | | 9 | |
| 18 | | 10 | |
| 19 | | 11 | |
| 20 | | 12 | |
| 21 | | 13 | |
| 22 | | 14 | |
| 23 | | 15 | |
| 24 | | 16 | Third Index |
| 25 | | 17 | |
| 26 | | 18 | |
| 27 | | 19 | |
| 28 | | 20 | |
| 29 | | 21 | |
| 30 | | 22 | |
| 31 | End | 23 | |
| 32 | | 24 | Out of bounds Index |
| 33 | | | |
| 34 | | | |
| 36 | | | |
| 37 | | | |
| 38 | | | |

FIGURE 1

TRANSPOSE ADDRESS MODE IN GENERAL PURPOSE DSP PROCESSOR

BACKGROUND

The invention relates to digital signal processing, and in particular to register-indirect addressing modes used in digital signal processing systems.

Digital signal processing (DSP) has become the best solution for many types of signal processing. DSP systems support applications such as speech coding and decoding in digital cellular phones, encryption/decryption used in secure communications, speech recognition for user interfaces, audio and video systems, data communication equipment such as modems, vision systems, image compression and decompression, beam forming, and spectral analysis. DSP processors—microprocessors with special digital processing capabilities—make some of these applications practical for the first time, and offer major advantages over analog processing systems such as insensitivity to environment and insensitivity to component tolerances, leading to more predictable system response or behavior. Some DSP systems have other advantages—the DSP processors are reprogrammable, in some cases in the field, to perform a variety of tasks without the need to use different electronic components. These types of advantages along with advances in integrated circuit manufacturing make DSP systems and processors rapidly growing areas of electronics.

A DSP system or processor performs mathematical operations to a sequence of samples of a physical signal, which have been first converted into a digital format, that is, a sequence of numbers. The samples can be obtained by a transducer such as a microphone and converted into digital format by an analog-to-digital converter. After mathematical processing occurs in the DSP system, a digital-to-analog converter can convert if desired the digital signals back into analog signals for use in the real world.

DSP systems share features to enable repetitive numerical computations. For example, the data path of DSP processors—where math manipulation of the signals takes place—is not used to calculate the addresses of the operands for instructions. Instead, DSP processors provide dedicated hardware referred to as an address generation unit to calculate addresses. The address generation units calculate the address while the data path performs math on the data, which improves processor performance. The address generation units are also capable of many types of addressing modes.

In register-indirect addressing mode, the data addressed are in memory, and the addresses of the memory locations are held in register(s). One form of register-indirect addressing uses modulo arithmetic to manage data buffers. A data buffer is a section of memory used to store data from off-chip or from prior calculations until the processor is ready to process the data. Because memory is a resource, the program only allocates some of the memory for use as a buffer. Some DSP systems manage data flow into the buffer by a first-in-first-out (FIFO)—the data is read from the buffer in the same order it arrived. To manage the FIFO buffer, the program includes a read pointer and a write pointer in a register. The read pointer points to (i.e., contains the address of) the memory location where the next data will be read from the buffer, while the write pointer points (i.e., contains the address of) to the location where the next data value to arrive will be written. After a read or write operation is performed, the read or write pointer advances. The program must check after each advance whether the pointer has reached the last location in the buffer. If the check shows the pointer has reached the end of the buffer, the program resets the pointer to point to the first location of the buffer. Checking whether the pointer has reached the end and resetting it if it has is time-consuming. This degrades processor performance if the DSP system makes extensive use of the buffers.

To address this problem, DSP systems have used circular buffers to automatically perform the action of checking after each buffer address calculation whether the pointer has reached the end of the buffer and adjusting it relative to the buffer location if necessary.

FIG. 1 illustrates the operation of a circular buffer. The lowest address of the buffer is the base address and the highest is the end address. Thus, in FIG. 1 the buffer is 24 in length. The index register contains the next pointer to be accessed in the buffer. In the example, the index register plus the base initially point at address 8. If an increment of 8 is added, the next index plus the base points at address 16. If another increment of 8 is added, the index plus the base points at address 24. Thus, the first three memory accesses are in the buffer. However, if another increment of 8 is added, the index pointer plus base advance to address 32. A circular buffer detects this is out of bounds and wraps the index around in the following manner. If the current index+increment−length of the buffer is less than zero (e.g., 8+8−24), the next index=current index+increment. On the other hand, if the current index+increment−length of the buffer is greater than or equal to zero (e.g., 16+8−24), the next index=current index+increment−length of the buffer. Thus, if the next index pointer plus base would point beyond the end address, the next index wraps around to be 0 and the next index plus base points at address 8. In short, after the read pointer or the write pointer of the index register reaches the "end" of the buffer, it automatically advances to the "start" of the buffer, making the buffer appear circular to the programmer.

FIG. 2 illustrates circular buffers have significant set up overhead when performing matrix multiplication. For example, 4×4 matrix multiplication results in sixteen elements in which the top row of four elements is obtained by multiplying the top row of the left matrix by each of the four columns of the right matrix. Thus, a DSP processor reads data from the buffer of memory in the first row of the left matrix: a00, a01, a02, and a03 as shown, then the left column of the right matrix: b00, b10, b20, and b30, Each of the remaining rows of the left matrix must be also multiplied by each of the four columns of the right matrix and each time the DSP processor traverses adjacent columns in the right matrix, it requires set up, which costs instructions cycles. For example, set up may require two instruction cycles to initialize the base register, load the increment register, select the format (e.g., byte, half-word, and word), and load the modulo. Thus, eight set up operations required for a 4×4 matrix will require 16 instruction cycles. If the DSP processor could directly access the columns of the right matrix, that is, transpose their addresses without set up, it would significantly boost DSP processor performance of matrix multiplication.

SUMMARY OF THE INVENTION

The invention describes systems and methods for register-indirect addressing modes used in digital signal processing systems. The invention implements both register-indirect addressing mode and modulo arithmetic to transpose the addresses. The transpose addressing mode can efficiently be used in matrix multiplication. By sharing logic used in a circular buffer, it adds a new address mode to directly access column data, which improves matrix computation. The overhead of the transpose mode is minimal by sharing the existing hardware and/or software used in circular buffers.

BRIEF DESCRIPTION OF THE DRAWINGS

FIG. 1 illustrates a circular buffer.

DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is best determined by reference to the claims.

Figure 2:
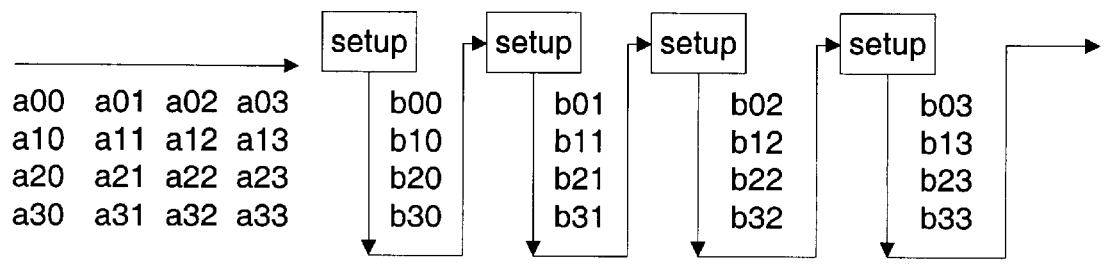
FIG. 2 illustrates how matrix multiplication was typically implemented.
Figure 3:
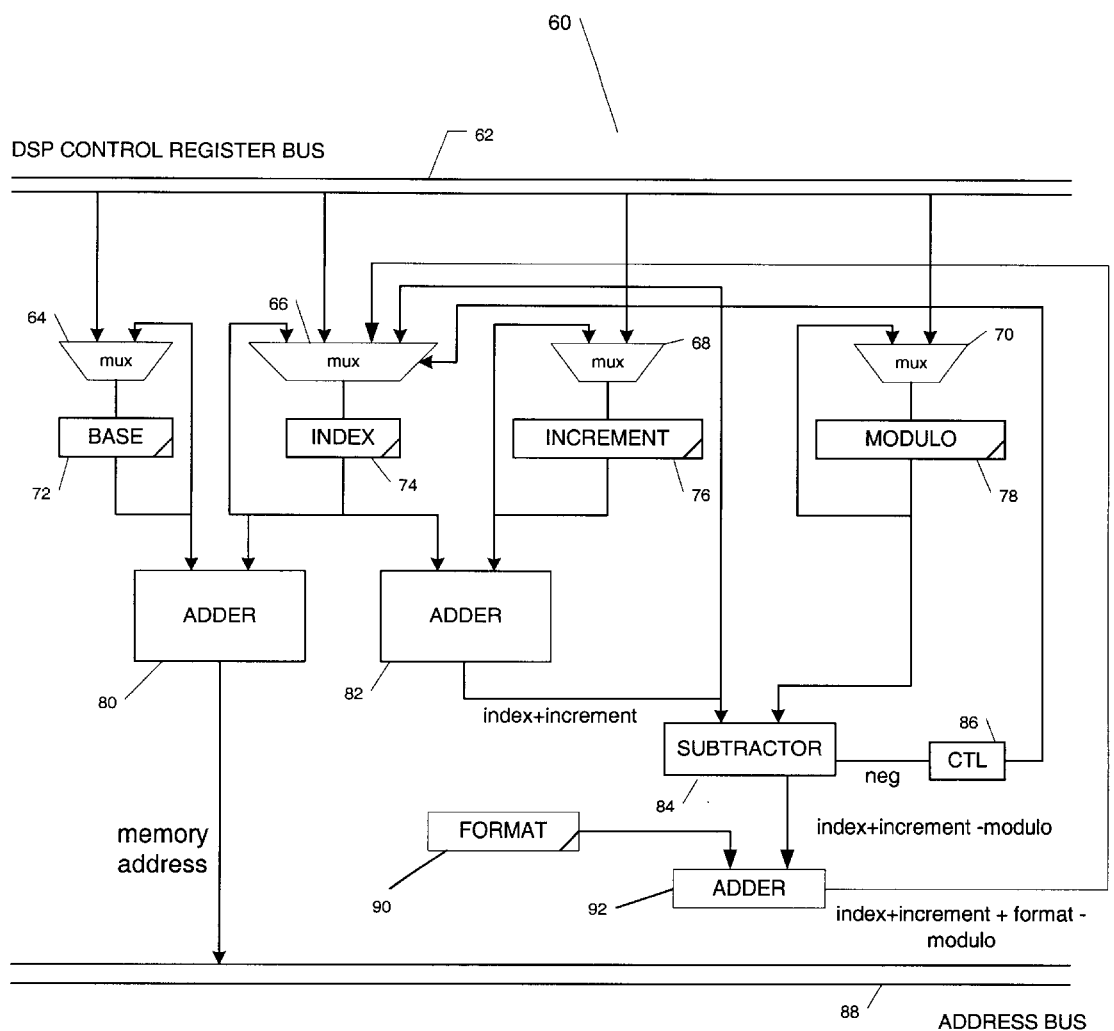
FIG. 3 is an embodiment of the pertinent part of the address generator for implementing transpose mode addressing.

FIG. 3 shows an address generator unit 60 for implementing transpose mode addressing. In this embodiment, the address generator unit 60 provides a set of DSP control registers:

A base register 72 containing the lowest (or highest) numbered address in the buffer, An index register 74 containing the next index to be accessed in the buffer, An increment register 76 containing the size of the increment (decrement), A modulo register 78 containing the matrix size or circular buffer size, and A format register 90 containing the data format.

In one embodiment, the base register 72 contains the base address of a circular buffer. The index register 74 indexes into the circular buffer. The increment register 76 contains the value by which the index register 74 will be updated for the next circular buffer access. The format register 90 contains the data format, so that in the transpose address mode, when the index wraps around from a column, by adding the format register, it will point to the first element in the next column. The physical memory address to the circular buffer access is calculated by adding the base register 72 and the index register 74. If the beginning of the circular buffer is the lowest address of the buffer, the increment register 76 preferably contains a positive value so as to advance the index pointer through the buffer. The value of the increment can be one or more bit, but in memory-aligned access will be a cell of memory such as a byte, a half word, 32-bit word, or a 64-bit word. It is not essential to the invention that the increment be a certain size or limited to less than or equal to a 64-bit word. If the beginning of the circular buffer is the highest address of the buffer, the increment register is loaded with a decrement value. If desired a control register bus 62 can output different increment values through a multiplexer 68 to the increment register 76. It should be understood the registers described above could be combined into one or more registers. The modulo register 78 contains one or more bit, but may be preferably the matrix size to implement transpose mode addressing or the circular buffer size as will be explained below.

An instruction cycle of the DSP processor (not shown) initializes or sets the base register 72, the index register 74, the increment register 76, the modulo register 78, and the format register 90 through the control register bus 62 and the multiplexers 64, 66, 68, and 70 with the values discussed earlier. On the next cycle, the content of the base register 74 and the index register 76 are fed into an adder 80. The adder 80 outputs the base+index to the address bus 88, which is the initial address of the buffer.

The logic shown in FIG. 3 is preferably implemented in hardware, but can be software if desired or a combination thereof. The logic changes the value of the index register 74 for the next access into the buffer. The value of the index register 74 is fed to an adder 82 along with the value of the increment register 76. This value of the index and increment is an output from the adder 82 and fed as an input to both the multiplexer 66 and a subtractor 84. The modulo register 78 outputs its contents to another input of the subtractor 84. The subtractor 84 outputs its value of the index+increment−modulo to the multiplexer 66. If the index+increment−modulo is negative, a control signal 86 selects that the increment+index pass through the multiplexer 66 to be the new value contained in the index register 74. If the index+increment−modulo is positive, the control signal 86 selects that the index+increment−modulo be an input to an adder 92 along with the value in the format register 90. The adder 92 then outputs the index+increment+format−modulo to the multiplexer 66 to become the new value in the index register 74. In either event, the value contained in base register 72 is input along with the new value of the index register 74 into the adder 80, which provides the effective address to the address bus 88.

In an alternative embodiment, the logic is similar to that shown in FIG. 3, with the following differences. The value in the increment register 76 is negative, i.e., a decrement value, the base register 72 holds the highest numbered address in the buffer, and an adder replaces subtractor 84. Further, if the index+increment −modulo is positive, a control signal 86 selects that the increment+index pass through the multiplexer 66 to be the next index value contained in the index register 74. If the index+increment−modulo is negative, the control signal 86 selects that the index+increment+modulo pass through the multiplexer 66 to become the next index value in the index register 74. In either event, the value contained in the base register 72 is input with the new value of the index register 74 into the adder 80, which provides the effective address to the address bus 88.

Figure 4:
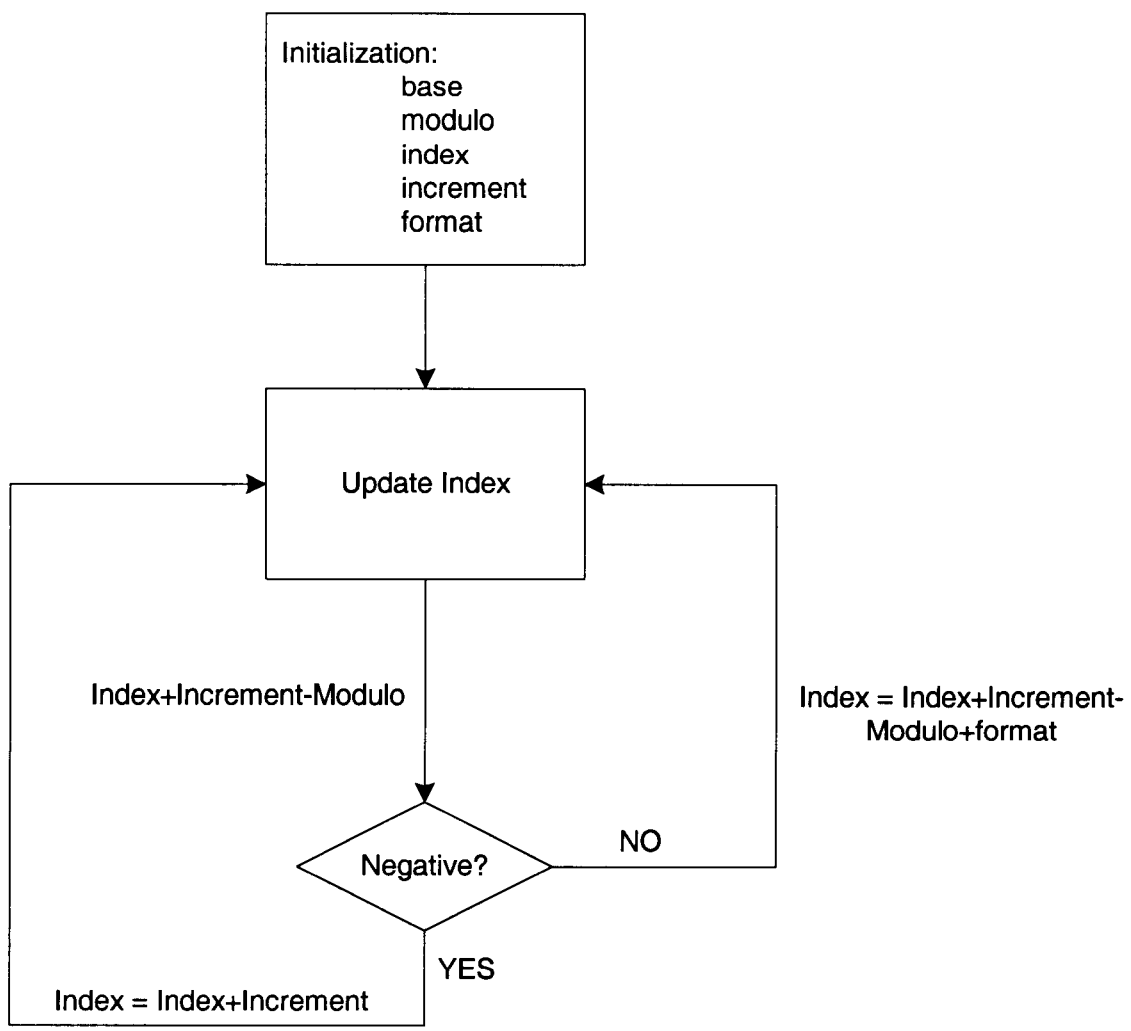
FIG. 4 is a flowchart illustrating transpose mode addressing.

FIG. 4 is a flow chart of a program running in the DSP processor to implement transpose addressing mode of a circular buffer such as shown in FIG. 1 using the logic described above. For transpose mode, the programmer will set the increment to the row width and the modulo to the matrix size. In addition, the program includes a function as follows:

Memory address=base+current index

If index+increment−modulo<0,

Then next index=current index+increment

Else next index=current index+increment−modulo+format

To ensure that the accuracy of the address specified by the index, the bit width of the next index should be the same as that of the current index. Thus, if adding the increment to the current index will result in a carry out bit in the next index, the carry out bit will be dropped to get the next index. Thus, hardware used to implement a circular buffer can be shared with the above components to carry out transpose addressing mode as discussed earlier.

Figure 5:
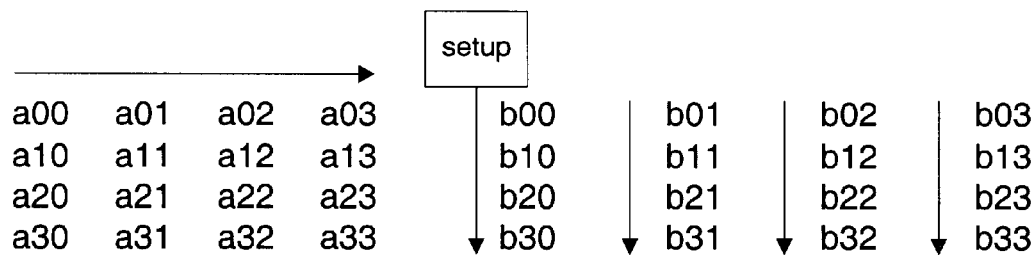
FIG. 5 illustrates how matrix multiplication can be implemented in the present invention.

FIG. 5 illustrates how the present invention can implement transpose address mode to efficiently address the necessary elements of matrix multiplication. To carry out this operation, a DSP processor may access a row of the left matrix: a00, a01, a02, and a03 in the buffer. It may also access data in each column of the right matrix, beginning with the far left column: b00, b10, b30, and b40, as well as the adjacent columns as before. If the programmer sets the increment to the row width, the modulo to the matrix size, the format to the data size (e.g., byte, half word, word, etc.), the subtracting of the modulo will automatically wrap the next index around to the top of each column. The addition of the format moves the pointer to the next column. This allows the DSP processor to access the entire matrix by columns, which significantly boosts performance of the matrix operation and therefore markedly improves DSP performance.

We claim:

1. A system for transpose mode addressing of an A×B matrix in a buffer memory, comprising:

a base register for storing a value for the base address;

an index register for storing an index pointer to memory;

an increment register for storing a value for an increment;

a modulo register for storing a value equal to A×B;

a format register for storing the size of the data format;

an address generator adding the base address and the index pointer to generate the memory address; and a wrap around index generator subtracting the index and increment from the size of the A×B matrix, and if out of bounds adding the data format such that next index will traverse adjacent columns of the matrix.

2. A method of transposing addresses in a circular buffer for matrix multiplication, comprising:

setting an index register;

setting an increment register to the row width of a matrix;

setting a modulo register to the matrix size;

setting a format register to the data size;

calculating an absolute address equal to the base address+current index;

calculating a wrap around next address equal to the index+increment−modulo+format;

calculating the non-wrap around next index equal to the index+increment; and using the non-wrap around next index to update the index register if the index+increment−modulo is negative and the wrap-around next index if positive.

* * * * *